(12) United States Patent
Koh

(10) Patent No.: US 8,537,266 B2
(45) Date of Patent: Sep. 17, 2013

(54) APPARATUS FOR PROCESSING DIGITAL IMAGE AND METHOD OF CONTROLLING THE SAME

(75) Inventor: Sung-shik Koh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 361 days.

(21) Appl. No.: 12/952,469

(22) Filed: Nov. 23, 2010

(65) Prior Publication Data

US 2011/0187916 A1    Aug. 4, 2011

(30) Foreign Application Priority Data

Feb. 2, 2010    (KR) .................... 10-2010-0009677

(51) Int. Cl.
*G03B 13/00* (2006.01)
(52) U.S. Cl.
USPC ..................................... 348/346; 348/345
(58) Field of Classification Search
USPC ..................... 348/222.1, 345, 346
See application file for complete search history.

(56) References Cited

U.S. PATENT DOCUMENTS

| | | | |
|---|---|---|---|
| 8,169,509 B2* | 5/2012 | Tsuruoka | 348/241 |
| 2006/0033831 A1* | 2/2006 | Ejima et al. | 348/333.01 |
| 2007/0165282 A1* | 7/2007 | Sambongi et al. | 358/3.21 |
| 2008/0259201 A1* | 10/2008 | Iijima et al. | 348/345 |
| 2009/0079862 A1* | 3/2009 | Subbotin | 348/345 |
| 2009/0185064 A1 | 7/2009 | Maniwa | |
| 2010/0091131 A1* | 4/2010 | Furukawa | 348/222.1 |

* cited by examiner

*Primary Examiner* — Tuan Ho
*Assistant Examiner* — Fayez Bhuiyan
(74) *Attorney, Agent, or Firm* — Drinker Biddle & Reath LLP

(57) ABSTRACT

Provided are a digital image processing apparatus for determining a focused portion in an image and showing the focused portion to a user and a method of controlling the same. The digital image processing apparatus includes a digital signal processor (DSP) which extracts the intensity of edges from an image and displays the combination of the extracted intensity of edges on the image. A user may determine whether a region of interest is successfully focused or not without additionally operating the digital image processing apparatus.

17 Claims, 7 Drawing Sheets

(a)

(b)

APPARATUS FOR PROCESSING DIGITAL IMAGE AND METHOD OF CONTROLLING THE SAME

CROSS-REFERENCE TO RELATED PATENT APPLICATION

This application claims the benefit of Korean Patent Application No. 10-2010-0009677, filed on Feb. 2, 2010, in the Korean Intellectual Property Office, the disclosure of which is incorporated herein in its entirety by reference.

BACKGROUND

The invention relates to a digital image processing apparatus for determining a focused portion in an image and showing the focused portion to a user and a method of controlling the same.

Generally, a digital image processing apparatus has a highlighting function for simply showing regions with excessive exposure and regions with insufficient exposure or a function for showing magnification of an auto-focus (AF) region, but no digital image processing apparatus has a function for showing an actually focused region. Therefore, a user has to manually confirm whether a region is actually focused or not by viewing the magnification of the region on a low-resolution display unit. Therefore, if a user does not confirm a captured image immediately, the user may regret not having confirmed the focus of the image later.

SUMMARY

The invention provides a digital image processing apparatus for determining a focused portion in an image and showing the focused portion to a user and a method of controlling the same.

According to an aspect of the invention, there is provided a digital image processing apparatus including a digital signal processor (DSP) which extracts the intensity of edges from an image and displays the combination of the extracted intensity of edges on the image.

The image may be a live-view image in which auto-focusing (AF) is attempted, a quick-view image played back immediately after the image is captured, or an image captured, stored, and played back.

The DSP may display an auto-focusing (AF) region and the extracted intensity of edges together or separately.

The DSP may display portions of the initial images, from which the intensity of edges is extracted, as blinking portions or portions of a particular color.

The DSP may includes a calculating unit for extracting the intensity of edges from the image; an obtaining unit for obtaining edges above a critical value from the extracted intensity of edges; and a display unit for combining the obtained intensity of edges with the image and displaying the combination.

The calculating unit may perform secondary differentiation with respect to the image.

The secondary differentiation may be performed by using a Laplacian operator.

According to another aspect of the invention, there is provided a method of controlling a digital image processing apparatus, the method including operations of (a) extracting the intensity of edges from an image; and (b) combining the obtained intensity of edges with the image and displaying the combination.

The image may be a live-view image in which auto-focusing (AF) is attempted, a quick-view image played back immediately after the image is captured, or an image captured, stored, and played back.

Secondary differentiation may be performed with respect to the image in operation (a).

The secondary differentiation may be performed by using a Laplacian operator.

After operation (a), critical value processing may be performed with respect to the extracted intensity of edges to obtain the intensity of edges above the critical value.

An AF region and the extracted intensity of edges may be displayed together or separately in operation (b).

Portions of the initial images, from which the intensity of edges is extracted, may be displayed as blinking portions or portions of a particular color.

BRIEF DESCRIPTION OF THE DRAWINGS

The above and other features and advantages of the invention will become more apparent by describing in detail exemplary embodiments thereof with reference to the attached drawings in which:

FIGS. 5($b$)-($e$) are graphs illustrating aspects of the focused portion image;

DETAILED DESCRIPTION

Figure 1:
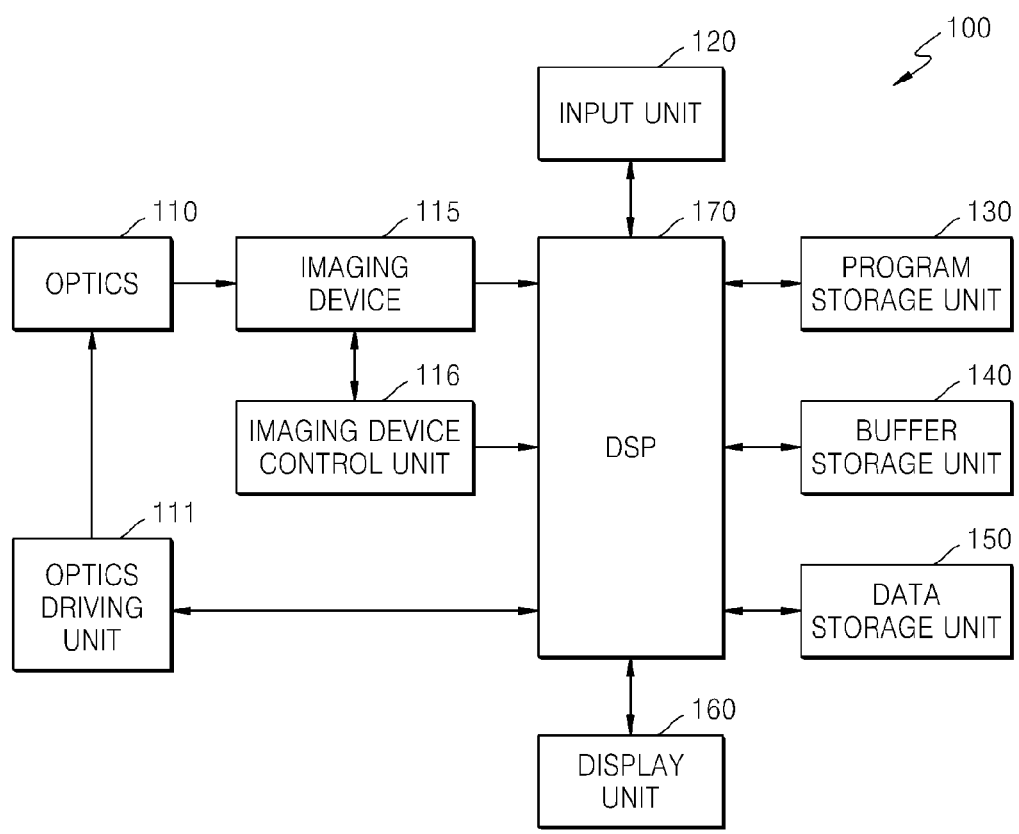
FIG. 1 is a block diagram showing an example of a digital image processing apparatus according to an embodiment of the invention.
Figure 2:
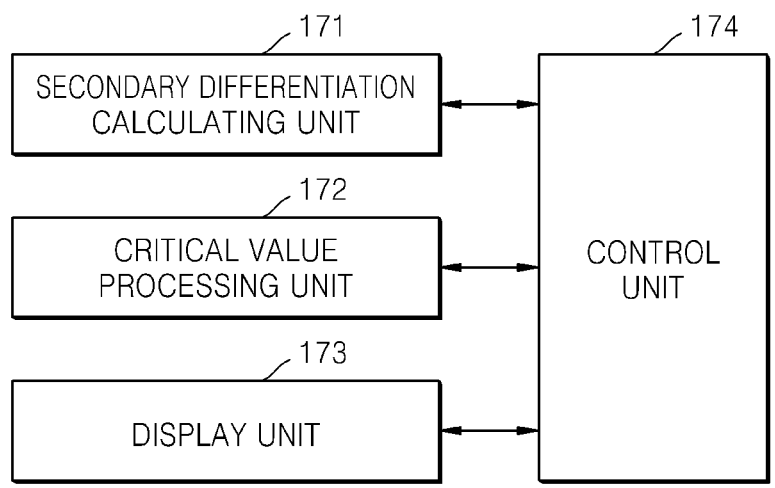
FIG. 2 is a block diagram showing a digital signal processor (DSP) of FIG. 1 in closer detail.

A digital image processing apparatus 100 according to an embodiment of the invention may include optics 110, an optics driving unit 111, an imaging device 115, an imaging device control unit 116, an input unit 120, a program storage unit 130, a buffer storage unit 140, a data storage unit 150, a display unit 160, and a digital signal processor (DSP) 170.The optics 110 provide optic signals input from an object to the imaging device 115. The optics 110 may include at least one lens, such as a zoom lens, which controls a viewing angle that is narrowed or widened according to focal lengths, and a focus lens, which focuses on an object. Furthermore, the optics 110 may further include an diaphragm for controlling an amount of light.

The optics driving unit 111 controls the positions of lenses, the opening of a diaphragm, etc. The optics driving unit 111 may move the focus lens. Furthermore, the optics driving unit 111 may adjust the opening of the diaphragm to control the amount of light. The optics driving unit 111 may control the optics 110 based on control signals, which are either automatically generated by image signals input in real-time or manually input by a user.

Optical signals, which have passed through the optics 110, reach a light receiving surface of the imaging device 115 and form an image of an object thereon. The imaging device 115 may be a charge-coupled device (CCD) or a complementary metal-oxide semiconductor (CMOS) for converting optical signals into electrical signals (or similar device). The imaging device control unit 116 may adjusts the sensitivity of the imaging device 115, for example. The imaging device control unit 116 may control the imaging device 115 based on control signals, which are either automatically generated by image signals input in real-time or manually input by a user.

The input unit 120 is a unit via which control signals may be externally input (e.g., control signals from a user). The input unit 120 includes various buttons, such as a shutter-release button, which inputs a shutter-release signal for capturing an image by exposing the imaging device 115 to light for a set period of time, a wide angle zoom button and a telescopic zoom button, which narrow and widen a viewing angle, a mode selection button for selecting modes including a text input mode, an image capturing mode, a playback mode, etc., a white balance setup selecting button, an exposure setup selecting button, and the like. The input unit 120 may be formed of various types of buttons as described above. However, the invention is not limited thereto, and the input unit 120 may have any of various forms via which a user may provide input; e.g., a keyboard, a touch pad, a touch screen, a remote controller, etc.

Furthermore, the digital image processing apparatus 100 includes the program storage unit 130, in which programs, such as an operating system (OS) for driving the digital image processing apparatus 100 and application programs, are stored, the buffer storage unit 140, in which data required during a process or result data is stored, and the data storage unit 150, in which image files containing optical signals and various data required by the programs are stored.

Furthermore, the digital image processing apparatus 100 includes the display unit 160 to display the operation status of the digital image processing apparatus 100 or image data captured by the digital image processing apparatus 100. The display unit 160 may provide video information and/or audio information to a user. To provide video information, the display unit 160 may be a liquid crystal display (LCD), an organic light emitting display (OLED) panel, an electrophoretic display (EDD) panel, or the like.

Furthermore, the digital image processing apparatus 100 includes the DSP 170 to process input image signals and to control each of the components based on the processed image signals or externally input signals. The DSP 170 may perform image quality improving processes, such as noise reduction, gamma correction, color filter array interpolation, color correction, color enhancement, or the like, with respect to input video data. Furthermore, the DSP 170 may either generate a video file by compressing video data generated by performing image signal processes for image quality improvement or restore image data from the image file. The format for compressing image data may be either a reversible one or an irreversible one. For example, image data may be compressed in the joint photographic experts group (JPEG) format or the JPEG 2000 format. The compressed image data may be stored in the data storage unit 150. Furthermore, the DSP 170 may also perform processes, such as a softening process, a coloring process, a blurring process, an edge embossing process, an image analyzing process, an image recognition process, or an image effect process. The image recognition process may be face recognition or scene recognition. Furthermore, the DSP 170 may perform image signal processes to an image to be displayed on a first display unit 164 and a second display unit 168 (not shown). For example, the DSP 170 may perform brightness level adjustment, color correction, contrast adjustment, edge embossment, screen splitting, generation of character images, image combination, or the like. The DSP 170 may be connected to an external monitor, perform predetermined image signal processes to image data, and transmit the processed image data, so that an image corresponding to the image data is displayed on the external monitor.

Furthermore, the DSP 170 may extract the intensity of edges from an image and may display the extracted intensity of edges on the image. Here, the DSP 170 may include a secondary differentiation calculating unit 171, a critical value processing unit 172, a display unit 173, and a control unit 174. Various modifications may be made herein. For example, the secondary differentiation calculating unit 171, the critical value processing unit 172, the display unit 173, and the control unit 174 may be components separate from the DSP 170. Detailed descriptions on operations of the secondary differentiation calculating unit 171, the critical value processing unit 172, the display unit 173, and the control unit 174 will be described later.

Hereinafter, operations of the DSP 170 will be described in detail with reference to FIGS. 2 through 5.

An image to be processed by the DSP 170 may be a live view image in which auto-focus (AF) is attempted, a quick view image immediately after being captured, or an image captured, stored, and played back.

When a first shutter-release button S1 is pressed as a half-shutter signal, the digital image processing apparatus 100 performs AF and adjusts amount of light. Here, if an object is focused by performing the AF, an AF region of the display unit 160 displays a green box. When an object is focused and amount of light is adjusted by pressing the first shutter-release button S1, a second shutter-release button S2 is pressed as a full shutter signal and an image is captured.

The secondary differentiation calculating unit 171 extracts the intensity of edges from an image under the control of the control unit 174. A Laplacian is a further differentiation of a gradient, and is used to detect the intensity of edges only. A gradient operator may be used for detecting edges in the image. Particularly, the gradient operator may detect edges where the brightness gradually changes. However, a secondary differentiation operator does not detect regions in which the brightness gradually changes in the image and only detect regions in which the brightness remarkably changes. Since edges are not clear in unfocused regions, secondary differentiation values are relatively small. Conversely, since edges are clear in focused regions, secondary differentiation values are relatively large. Therefore, it may be intuitively determined whether the image is successfully focused or not based on the distribution of secondary differentiation values within a region of interest. Thus, a focus region may be separated from an image. A Laplacian operator is a good example of secondary differentiation operators, because a Laplacian operator is capable of detecting clearer edges as compared to other secondary differentiation operators.

Figure 3:
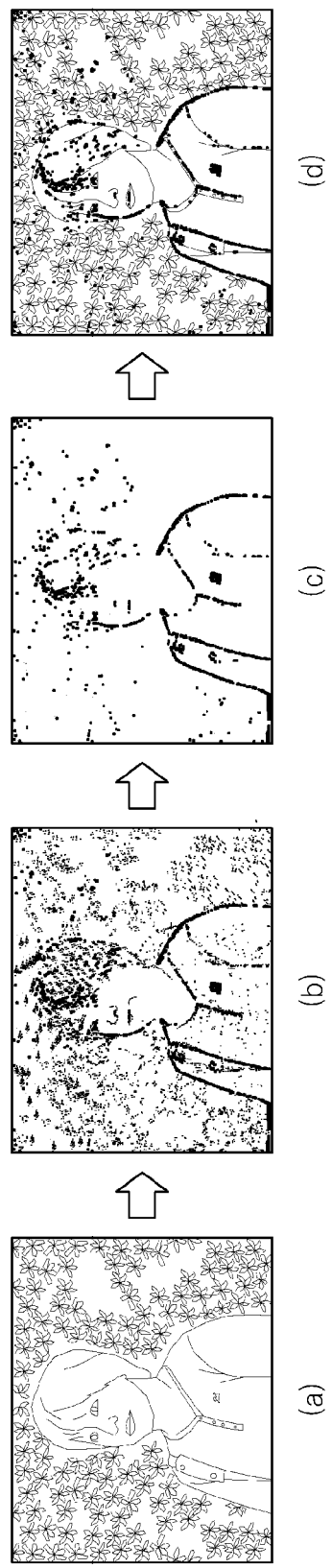
FIG. 3 is a series of pictorial diagrams showing an example that the DSP determines and shows a focused portion in an image.

FIG. 3 (*a*) shows a live view image in which auto-focus (AF) is attempted, a quick view image immediately after being captured, and an image captured, stored, and played back, and FIG. 3 (*b*) shows the results of performing secondary differentiations to the image shown in the FIG. 3 (*a*) by using a Laplacian operator.

The critical value processing unit 172 extracts edges above a critical value by performing critical value processing to secondary differentiated edges under the control of the control unit 174. A Laplacian operator, which is a secondary differentiation operator, is sensitive to noise, and thus more than actually existing edges are detected by simple secondary differentiation. Therefore, for more precise detection of actually existing edges, it is necessary to use a random critical value (e.g. 40) to compare to edges, so that only edges above the critical value may be defined as edges. FIG. 3 (c) shows an example in which only edges above a critical value are displayed by applying the critical value to the secondary differentiated image shown in FIG. 3 (b).

Figure 4:
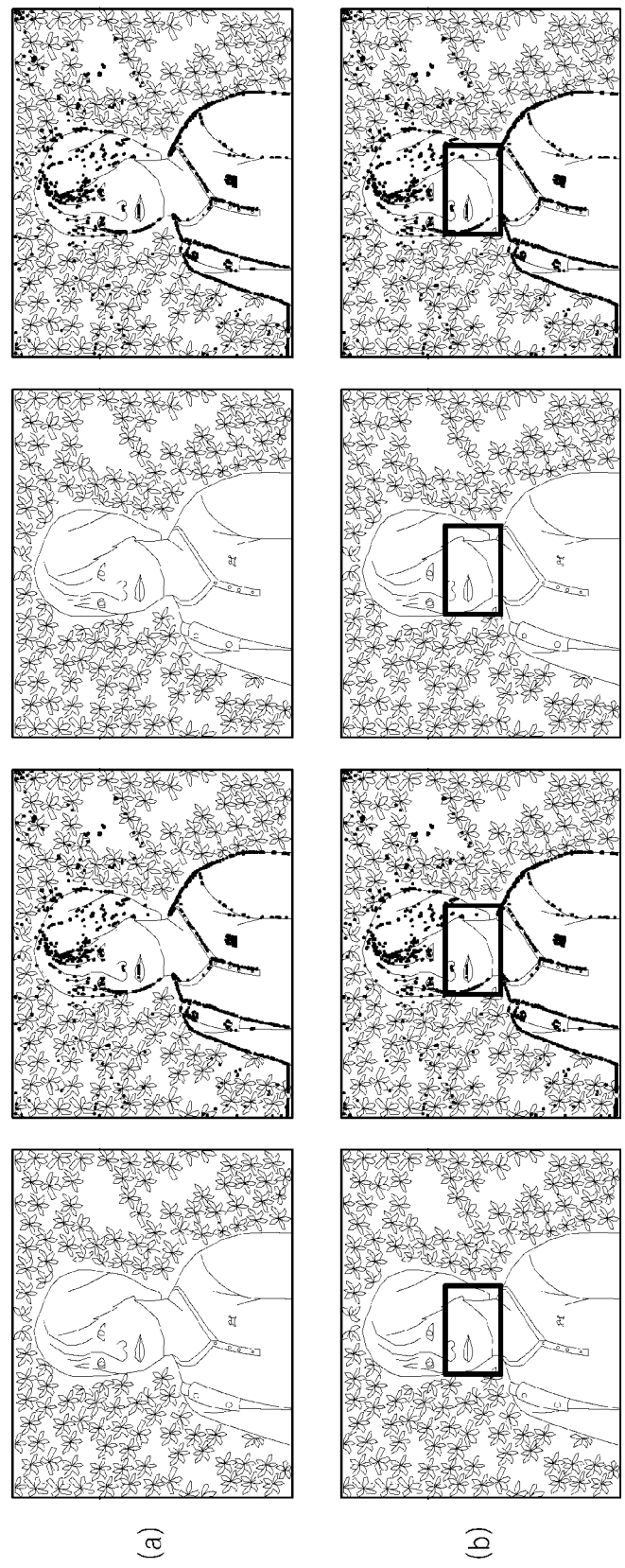
FIG. 4 is a series of pictorial diagram showing an example that the focused portion is extracted.

After the critical value processing, the display unit 173 combines the initial images (FIG. 3 (a)) and the intensity of critical value processed edges (FIG. 3 (c)) and displays the combination on the display unit 160 under the control of the control unit 174. Here, the display unit 173 may display the portions of the initial images, from which the intensity of edges is extracted, as blinking portions or portions of a particular color. FIG. 3 (d) shows portions corresponding to the intensity of edges in a particular color, as rendered in black and white. FIG. 4 (a) shows an example in which the display unit 173 displays portions of the initial images, from which the intensity of edges is extracted, as blinking portions, and FIG. 4 (b) shows an example in which the display unit 173 displays portions of the initial images, in which AF regions are indicated, from which the intensity of edges is extracted, as blinking portions.

Figure 5:
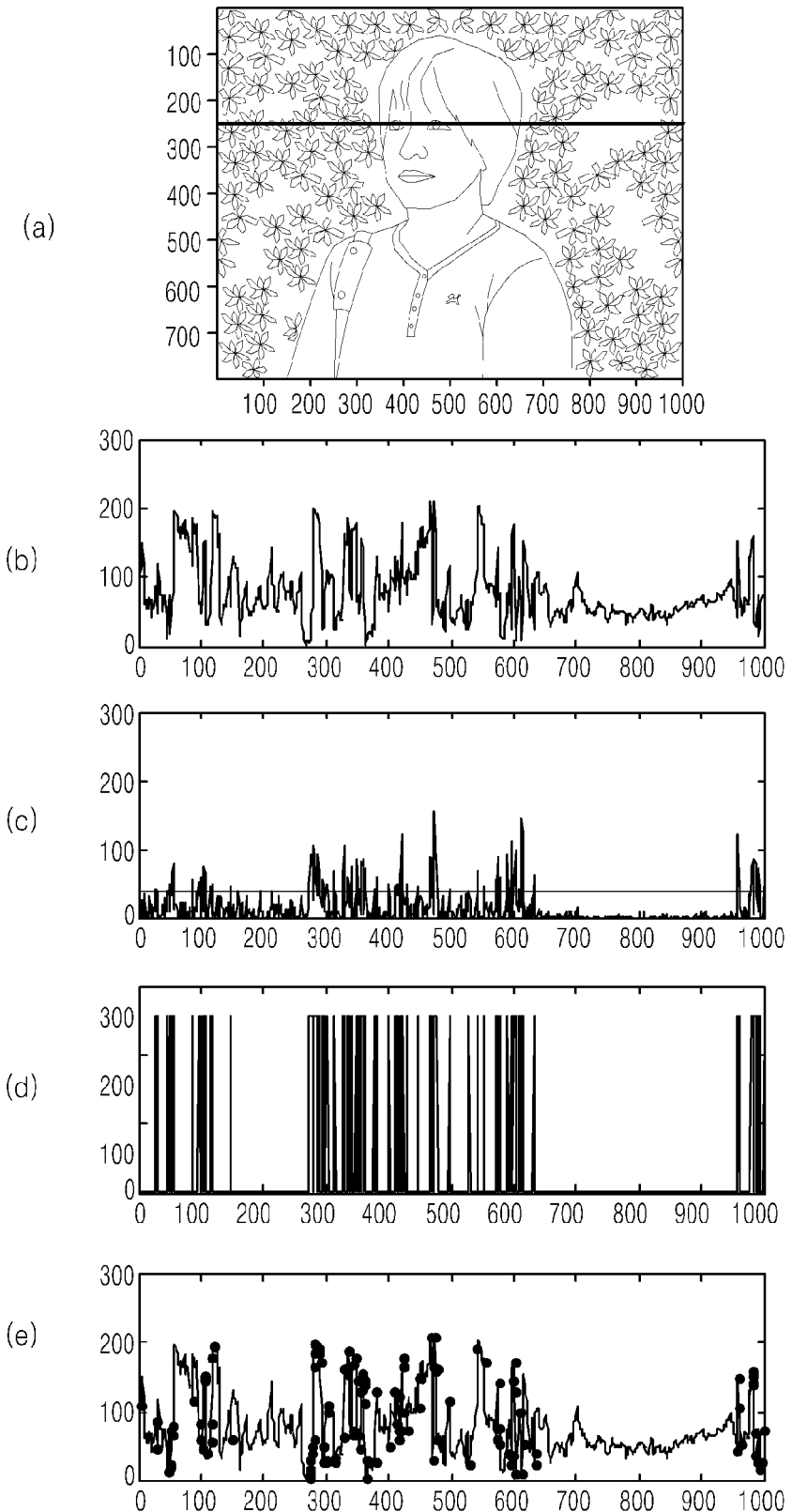
FIG. 5($a$) is a pictorial diagram showing an example that the focused portion is shown to a user.

FIG. 5 shows details of extracting focused portions from an image. FIG. 5 (a) shows an image, and FIG. 5 (b) shows image pixel intensity information with respect to a line 500 in the image shown in FIG. 5 (a). FIG. 5 (c) shows image information obtained by secondary differentiating the image information shown in FIG. 5 (b) by using a Laplacian operator, and FIG. 5 (d) shows an example in which focused points are extracted by performing critical value processing to the image shown in FIG. 5 (c). FIG. 5 (e) shows an example in which focused points are indicated in the image information shown in FIG. 5 (b).

Therefore, a user may determine whether a region of interest is successfully focused or not without additionally operating the digital image processing apparatus 100.

Figure 6:
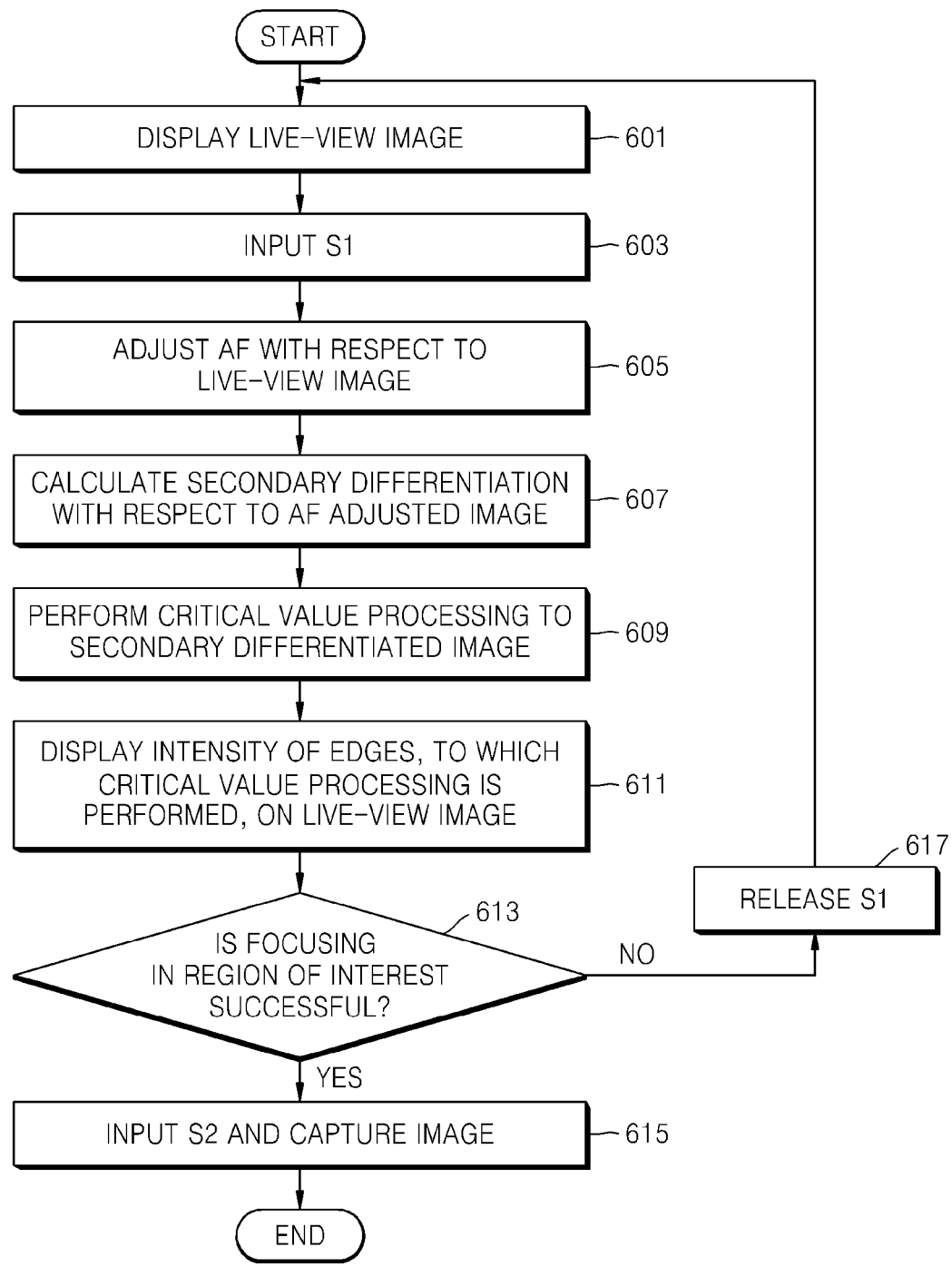
FIG. 6 is a flowchart showing a method of controlling a digital image processing apparatus according to an embodiment of the invention.
Figure 7:
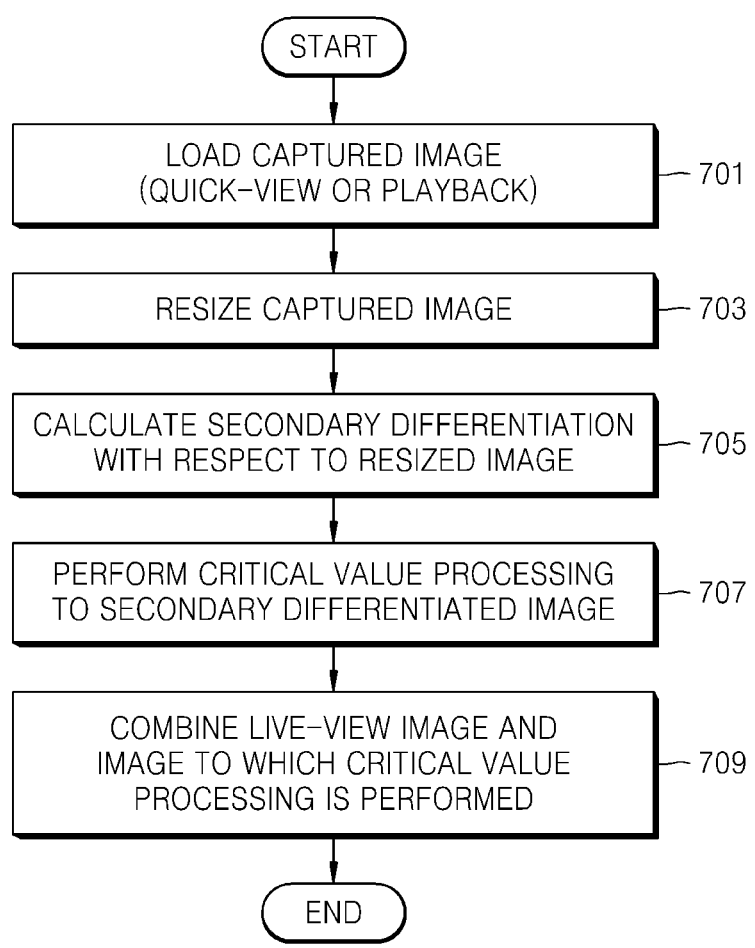
FIG. 7 is a flowchart showing a method of controlling a digital image processing apparatus according to another embodiment of the invention.

Hereinafter, a method of controlling a digital image processing apparatus, according to an embodiment of the invention, will be described in detail with reference to FIGS. 6 and 7. The method of controlling a digital image processing apparatus, according to the present embodiment of the invention, may by performed in the digital image processing apparatus 100 as shown in FIG. 1. However, according to embodiments of the invention, the main algorithm of the method may be carried out in the DSP 170 with the aid of other components in the digital image processing apparatus.

First, referring to FIG. 6, the method of controlling a digital image processing apparatus according to the present embodiment of the invention will be described below in detail.

The DSP 170, which received a control signal input by a user, displays a live-view image on the display unit 160 (operation 601).

When a user determines an image angle and inputs the first shutter-release button S1, the DSP 170 receives the input (operation 603).

The DSP 170, which received the input of the first shutter-release button S1, performs AF adjustment with respect to the live-view image (operation 605).

The DSP 170 performs secondary differentiation with respect to an image in which AF is adjusted (operation 607). For example, a Laplacian operator is used for secondary differentiation. A secondary differentiation operator does not detect regions in which the brightness gradually changes and only reacts with respect to regions in which the brightness remarkably changes. Thus, a focus region may be separated from an image. Since edges are not clear in unfocused regions, secondary differentiation values are relatively small. Conversely, since edges are clear in focused regions, secondary differentiation values are relatively large. Therefore, it may be intuitively determined whether the image is successfully in focusing or not based on the distribution of secondary differentiation values within a region of interest.

Next, the DSP 170 performs critical value processing to the secondary differentiated image (operation 609). A Laplacian operator, which is a secondary differentiation operator, is sensitive to noise, and thus more than actually existing edges are detected by simple secondary differentiation. Therefore, for more precise detection of actually existing edges, the DSP 170 compares the intensity of edges to a critical value (e.g., 50) and defines only edges above the critical value as edges.

After the critical value processing, the DSP 170 displays the intensity of edges to which critical value processing is performed on the initial live-view image (operation 611). The DSP 170 may display portions of the initial image, from which the intensity of edges is extracted, as blinking portions or portions of a particular color. Furthermore, the DSP 170 may display portions of the initial images, in which AF regions are indicated, from which the intensity of edges is extracted.

Next, the DSP 170 determines whether a region of interest is successfully focused or not (operation 613). The DSP 170 may determine whether a region of interest is successfully focused or not based on whether the first shutter-release button S1 is received or not and whether the second shutter-release button S2 is received or not.

If the region of interest is successfully focused, the DSP 170 receives the second shutter-release button S2 input by a user and captures an image (operation 615).

Otherwise, if the region of interest is not successfully focused, the DSP 170 receives a first shutter-release button S1 releasing signal from a user and displays a live-view image to let a user find another image angle (operation 617).

Therefore, a user may determine whether a region of interest in an image to be captured is successfully focused or not.

Next, referring to FIG. 7, a method of controlling a digital image processing apparatus, according to another embodiment of the invention, will be described below in detail.

The DSP 170, which received a control signal input by a user, displays an image on the display unit 160 (operation 701). Here, the image may be a quick view image immediately after being captured or an image captured, stored, and played back.

When the image is played back, the DSP 170 resizes the image for signal processing (operation 703). For example, an image having a size of 960×720 may be resized to an image having a size of 320×240.

After the playback image is resized, the DSP 170 performs secondary differentiation with respect to the resized image (operation 705). Details of the secondary differentiation are as described above.

Next, the DSP 170 performs critical value processing to the secondary differentiated image to obtain the intensity of edges above a critical value (operation 707).

After the critical value processing, the DSP 170 displays the intensity of edges to which critical value processing is performed on the initial live-view image (operation 611). The DSP 170 may display portions of the initial image, from which the intensity of edges is extracted, as blinking portions or portions of a particular color. Furthermore, the DSP 170 may display portions of the initial images, in which AF regions are indicated, from which the intensity of edges is extracted.

Therefore, a user may determine whether a region of interest in an image to be captured is successfully focused or not.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital image processing apparatus, comprising:
    a digital signal processor (DSP) configured to:
        perform a secondary differentiation operation on a digital image to generate secondary differentiation values;
        select secondary differentiation values that are greater in absolute value than a first predetermined constant, so as to generate selected values;
        determine a focus region of the image based on the spatial distribution of selected values, wherein a focus region is a region in which the selected values have magnitude greater than a second predetermined constant; and
    display a combination of the selected values on the image.

2. The digital image processing apparatus of claim 1, wherein the image is an adjusted image resulting from performing an auto-focus (AF) operation on a live-view image.

3. The digital image processing apparatus of claim 1, wherein the image is a quick-view image played back immediately after the image has been captured.

4. The digital image processing apparatus of claim 1, wherein the image is an image that has been captured, stored, and played back.

5. The digital image processing apparatus of claim 1, wherein the DSP displays the focus region and the selected values together or separately.

6. The digital image processing apparatus of claim 1, wherein the DSP displays portions of the digital image, from which the selected values have been generated, as blinking portions.

7. The digital image processing apparatus of claim 1, wherein the DSP displays portions of the digital image, from which the selected values have been generated, as portions of a particular color.

8. The digital image processing apparatus of claim 1, wherein the DSP comprises:
    a calculating unit configured to perform a secondary differentiation on the image so as to generate secondary differentiation values from the image;

an obtaining unit configured to select secondary differentiation values that are greater in absolute value than a first predetermined constant, so as to generate selected values and a display unit for combining the selected values with the image and displaying the combination.

9. The digital image processing apparatus of claim 1, wherein the secondary differentiation is performed by using a Laplacian operator.

10. A method of controlling a digital image processing apparatus, the method comprising operations of:

performing a secondary differentiation operation on a digital image to generate secondary differentiation values;

selecting secondary differentiation values that are greater in absolute value than a first predetermined constant, so as to generate selected values;

determining a focus region of the image based on the spatial distribution of selected values, wherein a focus region is a region in which the selected values have magnitude greater than a second predetermined constant; and combining the selected values with the image and displaying the combination.

11. The method of claim 10, wherein the image is an adjusted image resulting from performing an auto-focus (AF) operation on a live-view image.

12. The method of claim 10, wherein the image is a quick-view image played back immediately after the image has been captured.

13. The method of claim 10, wherein the image is an image that has been captured, stored, and played back.

14. The method of claim 10, wherein the secondary differentiation is performed by using a Laplacian operator.

15. The method of claim 10, wherein the focus region and the selected values are displayed together or separately.

16. The method of claim 10, wherein portions of the digital image, from which the selected values have been generated, are displayed as blinking portions.

17. The method of claim 10, wherein portions of the digital image, from which the selected values have been generated, are displayed as portions of a particular color.

* * * * *